March 30, 1965     G. R. ANDERSON     3,175,372
SYSTEM AND METHOD FOR DERIVING POTABLE WATER
Filed March 3, 1961     2 Sheets-Sheet 1

INVENTOR.
Gordon R. Anderson
BY George A. Woodruff
Atty.

March 30, 1965 G. R. ANDERSON 3,175,372
SYSTEM AND METHOD FOR DERIVING POTABLE WATER
Filed March 3, 1961 2 Sheets-Sheet 2

INVENTOR.
Gordon R. Anderson
BY George A. Woodruff
Atty.

United States Patent Office 3,175,372
Patented Mar. 30, 1965

3,175,372
SYSTEM AND METHOD FOR DERIVING
POTABLE WATER
Gordon R. Anderson, Barrington, Ill., assignor, by mesne
assignments, to Desalination Plants (Developers of Zarchin Process) Limited, Tel Aviv, Israel, a limited company of Israel
Filed Mar. 3, 1961, Ser. No. 93,071
16 Claims. (Cl. 62—123)

This invention relates to methods of and apparatus for driving operating mechanism, such as a fluid compressor or the like, disposed in a confined region under low temperature and low pressure conditions. More particularly, the invention relates to methods of and apparatus for externally driving a compressor located within a low temperature, low pressure chamber of a vacuum freezing system, such as a system for deriving potable water from sea water, wherein potable water from the system is utilized to eliminate mechanical seals, cool the vapor being compressed and cool the drive motor.

In a vacuum freezing system for the purpose indicated, having a tank structure providing adjacent freezing and condensing-ice-melting chambers under low temperature and pressure conditions, and requiring a compressor for removing water vapor formed in the freezing chamber and delivering compressed vapors into the condensing chamber, it is highly desirable to locate the compressor within the tank structure at the top thereof to allow the compressor to move the vapor along the shortest path between the chambers. While a compressor drive motor could be disposed within the tank structure in this arrangement, such location of the motor would pose serious difficulties. For example, the heat of motor operation would be detrimental to the maintenance of required low temperatures in the tank structure, and larger, more expensive, tank structures would be required, while exposure of the motor to the sub-atmospheric pressure conditions in the tank structure, to the water vapor therein, and to the corrosive-conducive conditions would be detrimental to the motor.

Cost is a particularly important factor in systems for producing potable water from sea water. In such systems very large volumes of vapor must be moved by the compressor, and the compressor operates at a high speed. In addition, a substantial pressure differential exists between the atmosphere and the inside of the tank structure through which the drive must pass, and air cannot be allowed to enter the tank structure and reduce the vacuum therein. To provide a mechanical seal that would be effective under these conditions would involve substantial expense.

In a vacuum-freezing system sea water, for example, is flash-evaporated in a freezing chamber to produce ice crystals, concentrated brine solution, and vapor. The large volume of vapor must be removed to allow the process to be continuous, and this is the function of the compressor. In order to have an economically practical desalting system, the vapor, which is pure water, must be recaptured by condensing as potable water, and the most efficient method known to accomplish this is to use the pure ice as a low heat sink for such condensation. Thus, ice is delivered to the adjacent condensing chamber and vapor passed into this chamber by the compressor for condensation on the ice, which by heat transfer both condenses the vapor and melts the ice to produce the sweet water product. The heat transfer rate from the vapor to ice is significantly greater at saturation conditions of pressure and temperature of the vapor. In passing through the compressor, the vapor is superheated, and the temperature of the vapor becomes greater than the saturation temperature at the pressure of the condensing chamber. Thus, it is highly desirable to cool the vapor as it leaves the compressor in the condensing chamber.

Additionally, since such a system operates at low temperatures, it is desirable to prevent heat from entering the system, and, since the drive motor is attached to the tank structure, the motor is preferably cooled.

With the method and apparatus described herein, all of these problems are, at least in part, solved, in that efficient and economical means are provided for eliminating mechanical seals, cooling the superheated vapor, and cooling the drive motor.

Accordingly, an object of this invention is to provide methods of and apparatus for driving a compressor in a system of the type described, which eliminates use of mechanical seals, cools the fluid passing through the compressor, and cools the compressor drive motor.

A further object of the present invention is to provide a drive arrangement for a compressor disposed as above indicated, having the motor located externally of the chambered tank structure with its shaft projecting into the tank structure to drive connection with the compressor therein, and wherein the drive provision is of a character such as to avoid any necessity for a mechanical shaft seal at the shaft projection into the tank structure.

Another object is to provide a motor drive as indicated, for a vapor compressor located in a confined sub-atmospheric pressure region and discharging compressed vapor into the region, wherein the motor is internally liquid-cooled and affords a controlled leakage flow of motor-cooling liquid into the confined region for evaporation therein to cool the compressed vapor in the region.

A further object is to provide an electric motor drive for a vapor compressor located within a confined sub-atmospheric pressure region and discharging compressed vapor therein, wherein the drive comprises an enclosed, internally fluid-cooled electric motor disposed externally of the confined region with its shaft extending into the region to drive connection with the compressor, the motor including a shaft bearing assembly forming a closure between the motor and the confined region, adapted to afford cooling liquid flow in cooling relation to the bearing, and to permit restricted passage of cooling liquid into the confined region for evaporation therein to cool the compressed vapor in the region.

A still further object is to provide methods of and apparatus for producing potable water from salt water, wherein potable water is evaporated into the compressed vapor for cooling the same and/or potable water is used to prevent air flow into the system.

These and other objects and advantages of the present invention will appear from the following description of a preferred embodiment thereof, as illustrated in the accompanying drawings wherein.

Figure 1:
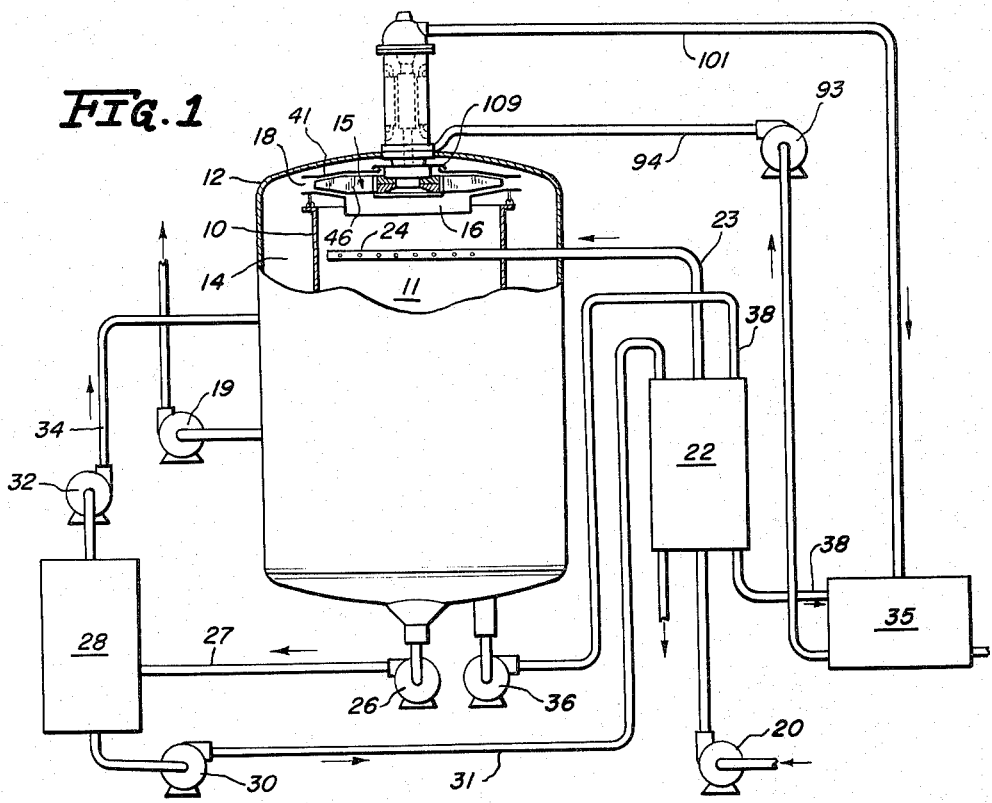
FIG. 1 illustrates diagrammatically a vacuum freezing system for producing potable water from sea water or the like, embodying a compressor in a confined sub-atmospheric zone or region of the system.

Referring first to FIG. 1, the methods and apparatus hereof are especially suitable for use in operating a compressor which is located within a sub-atmospheric region or chamber of a vacuum freezing system, as one for producing potable water from sea water or other saline solution. Such a system, here illustrated diagrammatically, includes an inner tank 10 forming a confined vacuum freezing chamber 11, and an outer surrounding casing or tank 12 forming with the inner tank a condensing chamber 14. A compressor 15 is mounted in the upper zone or region of the chamber 14 and overlies the upper end of the inner tank 10 with its intake port 16 open to chamber 11. The compressor discharge outlet 18, peripherally thereof, is directly open to the condensing chamber 14. Chamber 14 is maintained under sub-atmospheric pressure in the order of 4.6 mm. of mercury, as by a suitable vacuum pump 19, while the freezing chamber is under sub-atmospheric pressure in the order of 3.2 mm. of mercury, obtained partly by vacuum pump 19 and by the compressor 15 in operation. Raw liquid to be rendered potable, as sea water for example, is passed by a suitable pump 20 through a heat exchanger 22 wherein it is cooled to approximately 30° F., and over line 23 to a delivery distributor device 24 in freezing chamber 11. The cold sea water thus delivered into chamber 11 undergoes in the evacuated condition of the latter so-called "flash-freezing" resulting in the formation of water vapor and a mixture of ice and brine. Ice and brine are removed from the bottom of chamber 11 and delivered by pump 26 over line 27 into a separator device indicated at 28, wherein the ice and brine are separated. The remaining brine then is discharged to waste by pump 30 over line 31 which passes through the heat exchanger 22 to assist in cooling the incoming raw liquid, while the separated ice is delivered by pump 32 over line 34 into the melting chamber 14. Water vapor is withdrawn by compressor 15 from chamber 11, and is compressed and discharged directly into chamber 14 where the vapor condenses on the ice therein to produce potable water from both ice and vapor. The resulting potable water collecting in chamber 14 then is withdrawn for use or storage in tank 35, as by pump 36 over line 38 which extends through heat exchanger 22 for assisting in cooling incoming raw liquid.

Figure 2:
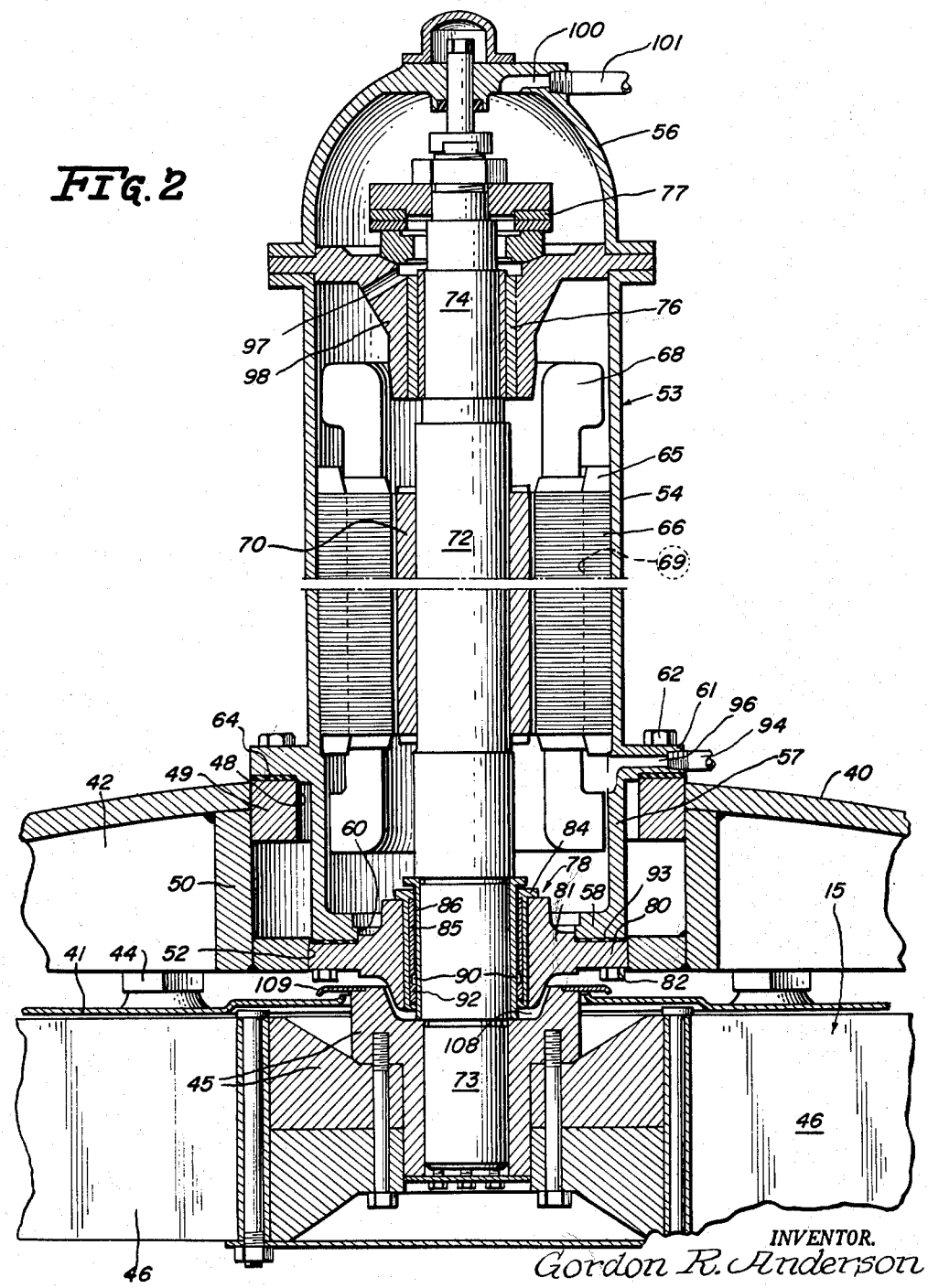
FIG. 2 is an enlarged sectional view of the drive means in connection to the compressor.

As shown in FIG. 2, the compressor 15 is within chamber 14 in a horizontal position adjacently below the top wall 40 of casing or tank 12, and has its housing 41 supported from the tank ribs 42 by bolting at 44. Within housing 41 is the compressor rotor comprising shaft mounting hub structure 45 and blades 46 on the hub. Drive of the compressor rotor is effected by the presently improved drive means now to be described.

The top wall 40 of tank 12 has a central opening 48 defined by a ring member 49 in unitary connection (as by welding) to the top wall, and depending from adjacent ring 49 is a guide member 50 providing a circular pilot opening 52 in axial alignment with opening 48 for a purpose to appear. The drive means here comprises an electric motor extending externally of the tank 12 in a position over the tank opening 48, the motor providing an elongate generally tubular motor housing 53 having main body portions 54, outer end closure 56 and lower end portion 57 terminating in an inwardly directed flange 58 defining a circular lower end opening 60 of the housing. Housing 53 is provided with an externally projecting mounting flange 61 at the juncture of body portion 54 and lower end portion 57, the flange being adapted for seating on the ring 49 in the vertical mounted position of the housing as shown. Flange 61 is firmly secured to ring 49 as by a plurality of bolts 62, and is sealed thereto in fluid-tight relation by suitable gasket means 64 between the flange and ring.

Within body portion 54 of the housing is an electric motor stator assembly 65 including stator core 66 suitably secured to housing portion 54, and field windings 68 extending through core slots indicated at 69. Cooperating with the stator is an induction type motor rotor member 70 which is mounted on the motor shaft 72, the shaft extending centrally and vertically in the housing. The shaft has its lower end portion 73 projecting through and beyond the housing opening 60, to supporting and drive connection with the hub 45 of the compressor rotor. Rotative support of the shaft is effected in its upper end portion 74 by a radial bearing indicated at 76 and a thrust bearing indicated at 77, and at its lower end 73 by a radial bearing 78.

Lower bearing 78 comprises a bearing support plate member 80 providing a central apertured bearing hub 81 through which the shaft extends, the plate marginally abutting the housing end flange 58 and being secured thereto by suitable bolts 82. The plate member is closely received in the pilot opening 52 of guide member 50 into which it is guided in mounting the motor housing. Carried by the plate hub 81 is a bearing collar 84 encircling the shaft and supporting a sleeve bearing or liner element 85 of suitable bearing material, the liner providing the bearing seat for the bearing sleeve 86 on shaft portion 73. Liner 85 is provided with a suitable number of grooves 88 (FIG. 3) preferably extending parallel to the shaft axis, the grooves being open at the upper end of the bearing, as at 89, to the interior of the motor housing, and terminating in an annular recess or pocket 90 inwardly adjacent the lower annular end 92 of the liner. The liner grooves 88 and recess 90 form restricted passages for the flow and distribution of fluid (as water, hereinafter referred to) in lubricating and cooling relation to the bearing parts 85 and 86.

The bearing plate 80 and bearing about the shaft portion 73 effect substantial closure of the motor housing 53 relative to the chamber 14 of tank 12, there being a suitable sealing gasket 93 applied between the plate 80 and motor housing end flange 58. Such closure is complete except for restricted leakage passage of fluid past the bearing liner as will be described presently.

Motor cooling and bearing lubrication are obtained by flooding the motor housing with fresh or purified water which, in the present example, is taken from the fresh water storage tank 35 (FIG. 1) of the purification system, in a closed circuit affording presure circulation through the motor housing.

To this end, fresh water is delivered by a pump 93 over line 94 to an inlet 96 here preferably provided in the housing mounting flange 61 and opening interiorly of the housing in its lower portion 57. The water thus admitted and flooding the housing, circulates relative to the lower bearing assembly 78 and upwardly about the motor stator and rotor, passing in the gap between the stator and rotor and along the stator slots 69 in spaces between field winding therein. The water then passes about the upper radial bearing 76 and through passages 97 in the bearing support 98, to and about the thrust bearing 77, and to discharge from the upper region of end closure 56 through an outlet 100. Return connection from the outlet 100 to tank 35 is over the return line 101 (FIG. 1).

Since the water circulated in the motor housing is at a pressure above atmospheric pressure, while the pressure in chamber 14 is sub-atmospheric, such pressure differential will result in some leakage flow of water past the lower bearing liner 85 into chamber 14. Such leakage could be substantially eliminated by a suitable positive sealing provision which, due to the large pressure differential here obtaining, would be expectedly complicated and costly. However, the present arrangement not only avoids any need for such sealing provision at the lower bearing, but affords a desirable controlled leakage at the bearing, it being noted that the motor cooling water is fresh water and the vapor and water developed in chamber 14 is also fresh or purified. Importantly here, the motor cooling water leaking or sucked into the chamber 14 past the lower motor bearing, as will presently appear, undergoes evaporation in chamber 14 and thereby serves to cool the compressed vapor delivered by the compressor 15. Vapor extracted from the freezing chamber 11 by the compressor and thereby compressed and delivered into chamber 14, is at an elevated temperature due to compression, approaching or attaining a superheated condition. Since hot or superheated vapor undesirably affects the heat transfer rate of vapor to ice, it is highly desirable to reduce the temperature of the compressed vapor in chamber 14. Accordingly, leakage in controlled small amount, for vapor cooling, is an advantage rather than a detriment to the operation of the system exemplified.

Since the motor housing is flooded with fresh water at a pressure above atmospheric the entrance of air into chamber 14 is prevented and the leakage of the water will not alter this condition. In the embodiment shown the fresh water utilized is taken from the storage tank, after the water has been warmed by heat exchanger 22, but if a greater cooling effect is desired on the vapor, colder fresh water may be used, such as the water available in line 38 prior to its entrance into heat exchanger 22.

Figure 3:
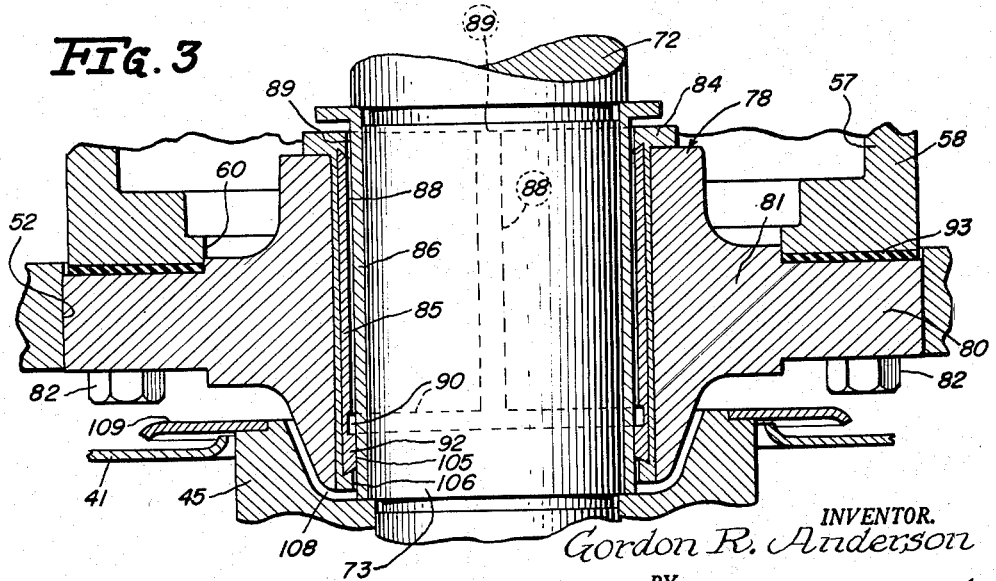
FIG. 3 is an enlarged fragmentary section at the lower bearing end of the drive means.

Referring particularly to FIG. 3, the lower annular end portion 92 of the bearing liner 85, between the annular recess 90 and the lower liner margin, is not grooved or otherwise channeled, but presents an uninterrupted inner surface opposed to the surface of the shaft sleeve 86. Thus, such portion 92 forms with the opposed shaft sleeve 86 a restricted leakage passageway indicated at 105 therebetween which opens at 106 to the chamber 14. Attainment of the desired controlled leakage past the bearing through passageway 105, is determinable by providing the bearing liner 85 to have its lower portion 92 of a diameter at its inner surface such as to afford a more or less close running clearance embrasure thereof with the shaft sleeve 86. As shown, the opening 106 which is annular, is adjacently above the compressor rotor hub 45 and communicates with the annular space 108 between the hub and the motor bearing 78. Space 108 opens to a plate-like flinger member 109 carried by and rotatable with the compresor hub 45, the flinger member overlying the inner portion of the compressor housing 41. Thus, the flinger member receives leakage water from space 108 and flings or injects or distributes the water over the compressor housing toward its periphery, the water thence undergoing evaporation in heat-exchange relation to the compressor delivered vapor in chamber 14; cooling the vapor more nearly to its saturated condition.

It will appear now from the foregoing description, that the present invention affords a drive provision external to a confined low temperature, low pressure region, and in drive connection to a compressor located within the region, which fully meets the several objectives hereinbefore stated. Thus, the water cooled electric motor drive, being external to the confined low temperature, low pressure region, is thereby removed from any motor heat effect in respect to the confined region. Moreover and importantly herein, the drive provision not only does not require any mechanical or other positive shaft seal in respect to the motor shaft extension into the confined region, but advantageously affords controlled motor cooling fluid leakage into the region. Additionally, cooling water flooding the motor interior and under positive circulation therethrough, not only cools the motor parts but is effective to prevent or to very substantially reduce motor operating heat conduction to the confined low temperature region, through the motor housing portion 57, lower bearing 78 and motor shaft 72.

Also it will appear from the foregoing description that the vapor in a desalting system may be cooled by the method of injecting water into the vapor which water flash evaporates. The effect of motor heat on the system may be minimized and mechanical seals eliminated by the methods of flooding the motor housing at least in the area where the shaft enters the chamber of the system and leaking a portion of the water into the chamber containing the compresed vapor, with attendant vapor cooling.

While the system described is one for producing potable water from sea water, it must be appreciated that the invention is not limited only to such systems, and wherever such a system is referred to herein, it is intended to include all other types of systems to which the invention applies and to all other uses of the system itself.

Having now described and illustrated a preferred embodiment of the invention, what is claimed is:

1. In combination with a casing and means therein to be driven, wherein the casing is maintained under sub-atmospheric pressure therein, said casing having an opening, a motor housing arranged over said opening and having fluid-tight sealed connection to the casing about said opening, motor stator and rotor members in the housing, a drive shaft supporting the rotor member and extending into the casing to drive connection with said means to be driven, bearing means carried by the housing on opposite sides of the rotor member, rotatably supporting said drive shaft, one of said bearing means between the rotor member and the means to be driven, substantially closing said housing relative to the interior of said casing, means including a source of fluid coolant for circulating fluid coolant in said motor housing about the motor stator and rotor members therein, said one bearing means being adapted to afford restricted passage of fluid coolant from the housing into the casing, and a flinger member in the casing rotatable with said drive shaft, for distributing fluid coolant entering the casing from said housing, externally over said means to be driven.

2. In a system for deriving potable water from saline solution, wherein ice and water vapor are formed, the system including a casing forming an ice receiving chamber, a compressor in the chamber for compressing and discharging compressed water vapor in contact with the ice, the vapor condensing on the ice and melting the ice forming potable water, and a potable water storage tank connected to the casing chamber; the combination therein of compressor drive means comprising a motor housing extending externally on said casing in sealed mounting thereon, an electric motor in the housing including a motor shaft projecting into the casing to drive connection with said compressor, shaft bearing means carried by the housing including a bearing member substantially closing the housing relative to the casing chamber, conduit means between said storage tank and the motor housing for the circulation of potable water through the latter, and said bearing member providing restricted potable water leakage communication between the motor housing and said casing chamber.

3. In a system for deriving potable water from saline solution, providing a vacuum freezing chamber wherein saline solution freezes to form water vapor and a mixture of ice and brine, a casing forming a melting chamber, means for maintaining sub-atmospheric pressure in the melting chamber, means for separating the ice and brine and for delivering the separated ice into the melting chamber, a compressor in the melting chamber having its intake communicating with the freezing chamber, operable to deliver water vapor from the latter into the melting chamber wherein the vapor condenses on the ice and melts the ice, forming potable water, and a potable water storage tank connected to the melting chamber; the combination therein of a motor housing extending externally on the said casing and sealed thereto, an electric motor in the motor housing including a motor rotor and shaft, said shaft extending into the casing to drive connection with the said compressor, shaft supporting bearing means carried by the motor housing including a bearing member substantially closing the motor housing relative to the melting chamber of the casing, conduit means between said potable water storage tank and said motor housing for circulating potable water through the latter and about the electric motor therein, and said bearing member providing restricted leakage communication between the motor housing and the melting chamber of said casing.

4. In a system of the character described, including casing means providing a confined region under subatmospheric pressure, means affording a source of water vapor, and a vapor compressor in said confined region for receiving and compressing water vapor from said source and discharging the compressed water vapor into the confined region, wherein the compressed vapor is at an elevated temperature due to compression by the compressor; the combination therein of compressor drive means comprising an enclosed motor on said casing means having a drive shaft projecting through the casing means into said confined region to driving connection with said compressor, means for circulating motor cooling water through said enclosed motor, shaft bearing means separating the interior of the enclosed motor from said confined region, said shaft bearing means including a bearing element embracing said shaft, and said element having an annular portion in substantially close running clearance with the shaft, forming therewith a passageway for leakage flow of cooling water from the interior of the enclosed motor into said confined region wherein the leakage water undergoes evaporation in heat-exchange relation with the compressed water vapor in the confined region, to cool said water vapor.

5. In a system for deriving potable water from saline solution, wherein ice and water vapor are formed, the system including a casing forming an ice receiving chamber, a compressor in the chamber for compressing and discharging compressed water vapor therein for contact with the ice, the vapor condensing on the ice and melting the ice, forming potable water, and a potable water receiver connected to the casing chamber; the combination therein of compressor drive means comprising motor means including a motor housing extending externally on said casing in sealed mounting thereon, the motor means providing a drive shaft projecting into the casing to drive connection with said compressor, and including a water-lubricated shaft supporting bearing member, said bearing member and shaft substantially closing the motor housing relative to the casing chamber, means for the delivery of water from said receiver to said bearing member for lubrication thereof, and said bearing member providing restricted water leakage flow therefrom into said casing chamber.

6. The method of sealing a drive shaft extending through a bearing positioned between a compressor located in a low pressure casing and a drive motor externally of the casing comprising the steps of flooding the motor housing with fluid, leaking a portion of the fluid along the shaft and through the bearing into said casing, and evaporating the fluid into the casing.

7. The method of driving a compressor, located in a low pressure chamber of a vacuum freezing system and serving to compress vapor, from a housed motor externally mounted to said chamber and having a shaft extending through a bearing in the chamber for driving engagement with the compressor, comprising the steps of flooding the bearing with a liquid of the vapor, and leaking controlled amounts of the liquid into the low pressure chamber and into the compressed vapor for evaporation of the liquid and cooling of the compressed vapor.

8. The method of claim 7 including the steps of sealing the motor housing to the chamber and flooding the motor housing with liquid of the vapor to cool the motor.

9. The method of claim 8, including the step of distributing the leaked fluid substantially uniformly in the compressed vapor for evaporation therein to cool the compressed vapor.

10. The method of preventing air leakage and adverse effects of heat in a system for producing potable water, and having a low pressure freezing chamber, a low pressure condensing chamber, a compressor for passing pure water vapor from the freezing to condensing chamber, and a motor externally mounted of the chambers and with a shaft for driving the compressor, comprising the steps of flooding the motor with pure water to cool the same, leaking controlled amounts of pure water along said shaft into said condensing chamber, distributing the leaked pure water in the condensing chamber into the pure water vapor, and evaporating the leaked pure water in the condensing chamber.

11. In a vacuum freezing system, a low pressure casing including a vacuum freezing chamber, means for producing a vacuum in said chamber, a bearing, driving mechanism in said casing, a shaft extending from the exterior into said casing through said bearing and connected to said driving mechanism, means flooding the bearing with fluid, and means for leaking a controlled portion of said fluid through the bearing into said low pressure casing for cooling a second fluid in said casing.

12. In a vacuum freezing system, a low pressure casing including a vacuum freezing chamber, means for producing a vacuum in said chamber, a drive motor, including a housing, externally mounted of said casing, a compressor located in said casing, a drive shaft connected between said compressor and casing and extending through said casing, means for flooding the motor housing with fluid, means for leaking a portion of said fluid along said shaft and through said casing into said casing, and means for evaporating said leaked fluid in said casing including a second fluid which is contacted with said leaked fluid.

13. In a vacuum freezing system, a low pressure chamber, a housed motor externally mounted to said chamber, a compressor located in said chamber, a shaft extending through a bearing in the chamber for driving engagement between said motor and compressor, said compressor serving to compress vapor formed in said chamber, means for filooding the bearing with a liquid of the vapor, and means for leaking controlled amounts of said liquid into said low pressure chamber and into the compressed vapor for evaporation of the liquid and cooling of the compressed vapor.

14. The system of claim 13, including means to seal the motor housing to said chamber, and means to flood the motor housing with liquid of said vapor to cool said motor.

15. In a system for producing potable water, a low-pressure freezing chamber, a low-pressure condensing chamber, a compressor for passing pure water vapor from said freezing to said condensing chambers, a motor externally mounted of said chambers and having a shaft for driving said compressor, means for preventing air leakage and adverse effects of heat in said system, comprising means to flood said motor with pure water to cool the same, means to leak controlled amounts of pure water along said shaft into said condensing chamber, means distributing the leaked pure water in the condensing chamber into the pure water vapor therein, and means to evaporate the leaked pure water in said condensing chamber.

16. The method of cooling vapor in a vacuum freezing system wherein vapor is moved from a freezing chamber by a compressor into a condensing chamber including the step of introducing a condensate fluid of the vapor into said vapor in the condensing chamber along a drive shaft of the compressor extending through a wall of the condensing chamber, said condensate fluid being substantially uniformly distributed about the condensing chamber into the vapor.

(References on following page)

References Cited in the file of this patent

UNITED STATES PATENTS

| | | |
|---|---|---|
| 1,661,489 | Meynardie | Mar. 6, 1928 |
| 1,865,614 | Caldwell | July 5, 1932 |
| 2,646,001 | Ray | July 21, 1953 |
| 2,667,127 | Rimann | Jan. 26, 1954 |
| 2,669,187 | Guyer | Feb. 16, 1954 |
| 2,688,946 | Jarsdillon | Sept. 14, 1954 |
| 2,885,963 | Ivanoff | May 12, 1959 |
| 3,049,889 | Carfagno | Aug. 21, 1962 |

FOREIGN PATENTS

| | | |
|---|---|---|
| 806,727 | Great Britain | Dec. 21, 1958 |
| 985,905 | France | Mar. 21, 1951 |